United States Patent
Abali et al.

(10) Patent No.: US 7,681,080 B2
(45) Date of Patent: *Mar. 16, 2010

(54) DIAGNOSTIC REPAIR SYSTEM AND METHOD FOR COMPUTING SYSTEMS

(75) Inventors: Bulent Abali, Tenafly, NJ (US); Robert A. Saccone, Jr., Glen Head, NY (US)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 11/970,292

(22) Filed: Jan. 7, 2008

(65) Prior Publication Data

US 2008/0104447 A1    May 1, 2008

Related U.S. Application Data

(63) Continuation of application No. 10/826,455, filed on Apr. 16, 2004, now Pat. No. 7,386,761.

(51) Int. Cl.
G06F 11/00 (2006.01)
(52) U.S. Cl. .............................. 714/27; 714/4; 714/18; 714/25; 714/26; 714/37
(58) Field of Classification Search ...................... 714/4, 714/18, 25, 26, 31, 38, 27
See application file for complete search history.

(56) References Cited

U.S. PATENT DOCUMENTS

| | | | |
|---|---|---|---|
| 5,062,040 A | 10/1991 | Bishop et al. |
| 5,325,517 A | 6/1994 | Barker et al. |
| 5,388,252 A | 2/1995 | Dreste et al. |
| 5,640,537 A | 6/1997 | Jessen et al. |
| 5,732,268 A | 3/1998 | Bizzarri |
| 5,748,882 A | 5/1998 | Huang |
| 5,784,549 A | 7/1998 | Reynolds et al. |
| 5,956,475 A | 9/1999 | Burckhartt et al. |
| 6,073,255 A | 6/2000 | Nouri et al. |

(Continued)

FOREIGN PATENT DOCUMENTS

JP    5075673 A    3/1993

(Continued)

*Primary Examiner*—Robert Beausoliel
*Assistant Examiner*—Charles Ehne
(74) *Attorney, Agent, or Firm*—Scully, Scott, Murphy & Presser, P.C.; Derek S. Jennings

(57) ABSTRACT

A diagnostic system and method for repairing computing devices comprises a diagnostic application running on a same computing system having a failed operating system (O/S). The diagnostic application is provided with access to the file system of the failed O/S image. The diagnostic software application collects relevant configuration information from the file system of the failed O/S image, and transports this information to a proxy system running the same operating system as the computing device being diagnosed. The proxy system utilizes the collected data to diagnose the subject failed O/S system. Once the proxy makes a determination it synthesizes repair information comprising new or modified files and instructions to be transported back to the diagnostic software system to apply. A network connection is provided between the computer running the diagnostic application and the proxy system that enables data to be easily transported between the two systems without human intervention.

20 Claims, 1 Drawing Sheet

U.S. PATENT DOCUMENTS

| | | |
|---|---|---|
| 6,108,571 A | 8/2000 | Minoz et al. |
| 6,138,250 A | 10/2000 | Nouri et al. |
| 6,145,088 A | 11/2000 | Stevens |
| 6,230,285 B1 | 5/2001 | Sadowsky et al. |
| 6,230,286 B1 | 5/2001 | Shapiro et al. |
| 6,281,894 B1 | 8/2001 | Rive |
| 6,718,482 B2 | 4/2004 | Sato et al. |
| 6,738,928 B1 | 5/2004 | Brown |
| 2004/0153724 A1 | 8/2004 | Nicholson et al. |

FOREIGN PATENT DOCUMENTS

| | | |
|---|---|---|
| WO | WO 94/08289 | 4/1994 |

DIAGNOSTIC REPAIR SYSTEM AND METHOD FOR COMPUTING SYSTEMS

RELATED APPLICATIONS

This application is a continuation of U.S. patent application Ser. No. 10/826,455, filed Apr. 16, 2004.

BACKGROUND OF THE INVENTION

1. Field of the Invention

The present invention relates generally to computer diagnostic systems and particularly, to a computer diagnostic system that executes under one operating environment (e.g., Linux) to gather information, diagnose, and make corrections to a second operating environment (e.g., Windows) on the same machine.

2. Description of the Prior Art

Often in the case of computer system failure, a diagnostic software package is executed to attempt to diagnose the cause of the failure. This software may be hosted in its own operating environment (e.g., Linux) outside of the operating system (O/S) that is normally executed on the machine (e.g., Windows). However, unless the diagnostic operating environment is the same as the one being diagnosed and repaired it will not be able to examine the internal configuration of the failed system image. This is because the configuration of the failed system (e.g., Windows) must be manipulated via proprietary interfaces exposed by the failed operating system which are not available in the diagnostic environment (e.g., Linux). For example, consider the case when the diagnostic software is running under Linux while the system to be diagnosed and repaired is a Windows system. This limits the types of repairs the diagnostic software may make. In many cases running the diagnostics software under the same operating system may not be practical for a number of reasons including: image size limitations, cost of additional licenses, or business decisions that do not allow the two O/Ss to be identical.

One proposed solution for a computer diagnostic system that executes under one operating environment (e.g., Linux) to gather information, diagnose, and make corrections to a second operating environment (e.g., Windows) on the same machine is to write a plethora of Windows diagnostic tools to run under Linux. For example, Linux based tools to manipulate the Windows registry (e.g., Regedt32), event log, INF files, user profiles, Active Directory database files, Security Descriptors, etc. This is a large complex programming and reverse engineering task as the physical layout of these entities on disk are Microsoft proprietary and often change with each update of Windows operating system (O/S). Moreover, there are always new facilities in upcoming releases of Windows O/S (e.g., .NET related system components) that vendors may not be privy to. This will require increased programming and reverse engineering effort to enable diagnosis via Linux based diagnostic tools.

It would be highly desirable to implement a system that facilitates diagnosing a failed computer system that obviates the complex programming and engineering tasks.

It would be highly desirable to provide a service that facilitates diagnosing a failed computer system without complex programming and engineering tasks.

SUMMARY OF THE INVENTION

The present invention relates to a method, computer program product and system for diagnosing and repairing computer systems. The invention is preferably aimed at circumventing the complex programming and engineering task issues associated with current diagnostic and repair methods, by using one or more proxy machines that run the same operating environment as the failed one. A diagnostic software application (e.g., Linux) running on a first computing platform sends relevant information to these proxy machines via a network connection (for example, if available) or through a slower mechanism for diagnostic and repair instructions.

Thus, according to the invention, there is provided a system and method for diagnosing and repairing computer systems. The system comprises a first computing system executing an operating system of a first platform type and subject to a failure diagnosis; an operating system of a second platform type adapted to be executed on the first computing system upon failure of the operating system of the first platform type; an application running under the operating system of the second platform type for obtaining diagnostic information pertaining to the failed operating system on the computing system; a second computing system executing the same operating system of the first platform type as the failed operating system executed on the first computing system; a means for communicating the diagnostic information obtained by the application to the second computing system; a means at the second computing system for utilizing the diagnostic information to diagnose the subject failed operating system of the first computing system; and a means executing at the second computing system for generating repair information for communication to the application running on the first computer system to repair the failed operating system.

Advantageously, the diagnostic repair system is configurable as a service provided by an entity to diagnose and repair remotely located computing systems having failed operating systems.

BRIEF DESCRIPTION OF THE DRAWINGS

The objects, features and advantages of the present invention will become apparent to one skilled in the art, in view of the following detailed description taken in combination with the attached drawing FIG. 1 that illustrates generally the diagnostic repair system 10 according to the invention.

DETAILED DESCRIPTION OF THE PREFERRED EMBODIMENTS

Figure 1:
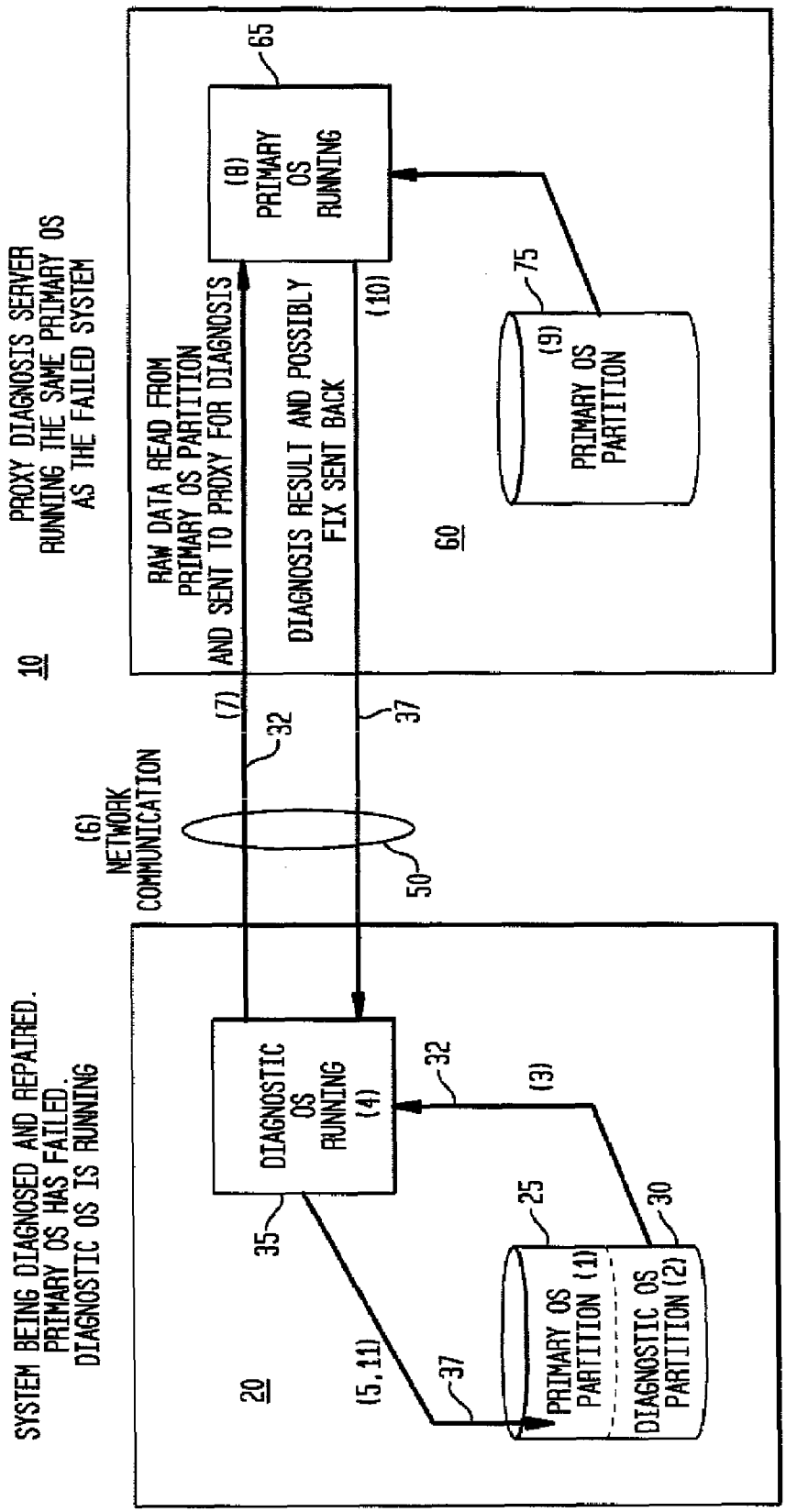

Upon a computer system crash, e.g., an operating system (O/S) failure due to data corruption, a virus, or any other conceivable recoverable error (hardware or software), for example, the present invention provides a relatively quick and easy diagnostic solution.

According to the present invention, a diagnostic software application running on the same computing system as the failed O/S, is provided with read/write access to a file system of the failed O/S image. Using this capability, the diagnostic software application collects relevant configuration information and error logs from the file system of the failed O/S image, and transports this information to a proxy system running the same operating system as the computing machine being diagnosed. The proxy system utilizes the collected data to diagnose the subject failed O/S system. Once the proxy makes a determination it will synthesize a set of instructions to be transported back to the diagnostic software system to apply. These instructions may include, but are not limited to: copying newly provided files or, overwriting existing data with modified files. ft is understood that other possible instructions include the provision of new or modified parameters to be passed to the failed O/S image's boot loader. For example, in the case of Windows O/S, it may need to be started in "safe mode", or, possibly, to change the kernel that is to be used, modify the number of CPUs the O/S should recognize, turn on boot logging, or, specify a different memory size. This system is most practically applied when there exists a network connection between the computer running the diagnostic software package and the proxy system. This allows data to be easily transported between the two systems without human intervention.

Due to the communication network connection, the proxy system may be remotely located from the computer running the diagnostic software package and hence, the owner of the proxy system may provide a computer diagnostic repair service.

FIG. 1 depicts generally the diagnostic repair system 10 according to the invention. As shown in FIG. 1, there is depicted a first system 20 to be diagnosed and repaired that includes a computing node, workstation, PC or any processing device implementing an Operating System (O/S) such as Windows, UNIX, etc. As depicted in FIG. 1, the O/S may reside in a memory, e.g., a hard disk, and includes a Primary OS partition 25 that includes a customer's O/S (e.g., Windows 2000 or like operating system). A second partition 30 in the memory includes a diagnostic O/S (e.g., a Linux-based, or a DOS-based operating system, etc). As described herein with respect to FIG. 1, it is assumed that, for purposes of discussion, the primary customer operating system executing on the first partition 25 is a Windows-based O/S while the diagnostic application residing on the second partition 30 is Linux-based. When the primary operating system fails (e.g., a "blue" screen is displayed, for example) the diagnostic O/S 30 is automatically booted and is executed as shown as the running diagnostic O/S 35 in FIG. 1. Preferably, according to the invention, the diagnostic O/S 35 accesses the primary O/S partition 25 to retrieve diagnosis related files 32, for example registry, system files, system settings, error files, error logs, IP addresses, and other system configuration files, etc. It is understood that some of these collected files may comprise information proprietary to the failed O/S and unable to be read by the diagnostic O/S 35. Thus according to the invention, the system further includes a communication link 50 enabling communications between the diagnosed system 20 to a proxy diagnostic system, e.g., a server device 60. Thus, as shown in FIG. 1, the diagnosed system 20 is running a diagnostic O/S 35 (e.g., Linux) and the proxy diagnostic server 60 is running the same as the primary O/S 25 (e.g., Windows) that was running on the diagnosed system 60. The system being diagnosed 20 sends the diagnosis related files 32 to the proxy diagnostic server 60 over communication link 50 (e.g., TCP/IP, Ethernet, or like "low-level" network connections, etc.) because the diagnostic O/S 35 (e.g., Linux) does not understand some of the file formats of the primary O/S (e.g. Windows) files 32. A primary O/S 65 executing on the proxy diagnostic server 60 having a hard disk drive partition 75 is of the same O/S format as the primary O/S on the system 20 being diagnosed, and receives the diagnosis related files 32 from the diagnosed system 20. The proxy diagnostic server 60 examines the diagnosis related information sent from the diagnosed O/S system 20 and, uses tools only available under primary O/S (e.g. Windows regedt32, EventViewer, memory dump analyzer), and not available under the diagnostic O/S (e.g. Linux) 35. The proxy diagnostic server 60 determines the problem and sends the repair information, and if possible, a fix (a service patch) 37, for example, over communication link 50 back to the system 20 being diagnosed. The system 20 being diagnosed receives the service patch 37. The executing diagnostic O/S 35 writes the service patch to the primary O/S partition 25, takes the necessary repair actions, and shuts down itself so that primary O/S may again start. It should be understood that it is also possible to perform the repair by having the diagnostic O/S e-mail the configuration data and then await an e-mail reply from the proxy diagnostic O/S.

A practical example of the diagnostic repair system 10 according to the invention illustrated in FIG. 1 is now described in the following example: Assume that pre-Boot Linux is used as the hosting environment 35 for the diagnostic tool which is reasonable since it has a small footprint, network connectivity, and is free. If a computer system fails that is running Windows O/S 25, the Linux-based diagnostic software is able to verify that it is not a hardware failure. However, it cannot perform a detailed examination of the Window's system configuration (registry, event log, security descriptors, upcoming Windows system components, etc.) as the data is stored in undocumented proprietary formats that need to be manipulated with interfaces that are only available under a running Windows system. However, as the files that Windows generates and stores in the course of normal operation may be read by Linux, the Linux-based diagnostic tool may collect the configuration information and send it off over the network to a proxy Windows system 65 for processing. A repair application is easily written to run on the proxy server 60 running the same O/S as the failed image. One necessary requirement is that the secondary system be enabled to examine the collected configuration data of the failed O/S image using the available Windows interfaces to determine problem causes and corrections. The repair application executing on the secondary server 60 will then send a repair file back to the Linux Diagnostic software that includes modified configuration data and replacement files with additional instructions to copy or overwrite files that may fix the failed O/S and/or update the disk accordingly. The Linux-based O/S may then shut down as the failed primary O/S (e.g., Windows) is rebooted.

In a farther embodiment, it is understood that an organization may provide a computing system diagnostic service for repairing failed operating systems. For instance, a remote service organization may comprise a number of proxy server devices each running one of many types of operating systems. Thus, the entity with the failed primary operating system will boot the hidden diagnostic repair application (e.g., Linux) to obtain the relevant configuration files of the failed O/S image and send these files to the service organization which includes a proxy device executing the same O/S as the entity. In the manner described, a repair file may quickly and easily be generated by the service party to fix the failed entity's computer O/S which file may be communicated back to the failed system over a network connection.

It should be further understood that there is a cost advantage in implementing the system 10 of the present invention, particularly, as the system avoids the need for a company that provides the Linux diagnostic software to purchase an additional Window's license for each system that it is supporting. For example, in a large organization, only a small number of additional Windows licenses will be needed to be purchased for the proxy devices compared to the total number that would need to be purchased, for example, had Windows (a primary O/s) been chosen as the pre-Boot environment for the diagnostic software package.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

We claim:

1. A system for diagnosing and repairing computer systems comprising:
    a first computing system executing an operating system of a first platform type;
    an operating system of a second platform type adapted to be executed on said first computing system upon failure of said operating system of said first platform type;
    an application running under said operating system of said second platform type for obtaining diagnostic information pertaining to said failed operating system;
    a second computing system executing the same operating system of said first platform type as said failed operating system;
    a means for communicating said diagnostic information obtained by said application to said second computing system;
    a means at said second computing system for utilizing said diagnostic information to diagnose the subject failed operating system of said first computing system; and
    a means executing at said second computing system for generating repair information for communication to the application running on said first computer system to repair the failed operating system.

2. The system as claimed in claim 1, wherein said generated repair information includes one or more new files necessary to the repair, and, an instruction for copying said new files back to said first computing system.

3. The system as claimed in claim 1, wherein said generated repair information includes one or more modified files necessary to the repair, and, an instruction for overwriting existing data with modified file data at said first computing system.

4. The system as claimed in claim 1, wherein said diagnostic information pertaining to said failed operating system comprises relevant file system configuration information including one or more from the group comprising: registry files, system files, system settings, error files, error logs, and other system configuration files of said failed operating system.

5. The system as claimed in claim 1, wherein said first computing system comprises a partitioned hard disk drive wherein said operating system of said first and second types executes on separate partitions.

6. The system as claimed in claim 5, wherein said operating system of a first platform type is a Windows-based operating system, and said application executing under said operating system of said second platform type is Linux-based.

7. The system as claimed in claim 1, wherein said communication means includes a network connection.

8. The system as claimed in claim 1, wherein said application running under said operating system of said second platform type is enabled to read data from and write data to the files associated with said failed operating system.

9. The system as claimed in claim 4, wherein said second computing system comprises operating system interface means for enabling the examination of the diagnostic information to determine problem causes and corrections to said failed operating system on said first computing system.

10. A computer system diagnostic and repair service for reviving a failed operating system executing on a remote computing system comprising:
    one or more proxy computing systems adapted to execute applications under one or more operating systems of varying platform types;
    a means located at one or more of said proxy computing systems for receiving diagnostic information obtained from a diagnostic application executing on said remote computing system having a failed operating system to be revived, said diagnostic information relating to said failed operating system being received at a proxy computing device executing the same operating system platform as said failed operating system platform;
    a means located at said one or more proxy computing systems for utilizing said received diagnostic information to diagnose the failed operating system to be revived at said remote computing system; and
    a means located at said one or more proxy computing systems for generating repair information adapted for communication back to said diagnostic application running on said remote computer system having said failed operating system, wherein said repair information is utilized to enable revival of said failed operating system at said remote computing system.

11. The computer system diagnostic and repair service as claimed in claim 10, wherein said diagnostic application executes at said remote computing system under a second operating system of a second platform type having been previously booted upon failure of a primary operating system.

12. The computer system diagnostic and repair service as claimed in claim 10, wherein said diagnostic information pertaining to said failed operating system comprises relevant file system configuration information including one or more from the group comprising: registry files, system files, system settings, error files, error logs, and other system configuration files of said failed operating system.

13. The computer system diagnostic and repair service as claimed in claim 10, wherein said generated repair information comprises: one or more new files necessary to the repair, and, an instruction for copying said new files back to said remote computing system; or, one or more modified files necessary to the repair, and, an instruction for overwriting existing data with said modified file data at said remote computing system.

14. The computer system diagnostic and repair service as claimed in claim 10, further comprising a network communication means for enabling communication of diagnostic information from said remote computing system to said proxy computing system and for enabling communication of repair information from proxy computing system to said remote computing system.

15. A program storage device readable by a machine, tangibly embodying a program of instructions executable by the machine to perform method steps for diagnosing and repairing a first computing system executing an operating system of a first platform type and subject to a failure diagnosis, said method steps comprising:
    providing an operating system of a second platform type adapted to be executed on said first computing system upon failure of said operating system of said first platform type;
    executing an application under said operating system of said second platform type for obtaining diagnostic information pertaining to said failed operating system on said first computing system;
    providing a second computing system executing the same operating system of said first platform type as said failed operating system executed on said first computing system;

communicating said diagnostic information obtained by said application to said second computing system;

utilizing said diagnostic information to diagnose the subject failed operating system of said first computing system; and generating repair information at said second computing system and communicating said repair information to the application running on said first computer system to repair the failed operating system.

16. The program storage device readable by a machine as claimed in claim 15, wherein said step of generating repair information includes generating one or more new files necessary to the repair, and, an instruction for copying said new files back to said first computing system.

17. The program storage device readable by a machine as claimed in claim 15, wherein said step of generating repair information includes generating one or more modified files necessary to the repair, and, an instruction for overwriting existing data with modified file data at said first computing system.

18. The program storage device readable by a machine as claimed in claim 15, wherein said step of obtaining diagnostic information pertaining to said failed operating system includes reading relevant file system configuration information including one or more from the group comprising: registry files, system files, system settings, error files, error logs, and other system configuration files of said failed operating system.

19. The program storage device readable by a machine as claimed in claim 15, wherein said step of generating repair information includes the step of providing operating system interfaces for enabling the examination of the diagnostic information to determine problem causes and corrections to said failed operating system on said first computing system.

20. A program storage device readable by a machine, tangibly embodying a program of instructions executable by the machine to perform method steps for reviving a failed operating system executing on a remote computing system, said method steps comprising:

a) providing a proxy computing system adapted to execute applications under one or more operating systems of varying platform types;

b) receiving diagnostic information obtained from a diagnostic application executing on said remote computing system having a failed operating system to be revived, said diagnostic information relating to said failed operating system being received at a proxy computing system executing the same operating system platform as said failed operating system platform;

c) utilizing said received diagnostic information at said proxy computing system for diagnosing the failed operating system to be revived at said remote computing system;

d) generating repair information at said proxy computing system;

e) communicating said generated repair information back to said diagnostic application running on said remote computer system having said failed operating system; and, f) utilizing said repair information to enable revival of said failed operating system at said remote computing system.

* * * * *